(12) United States Patent
Schoen et al.

(10) Patent No.: US 7,624,065 B2
(45) Date of Patent: Nov. 24, 2009

(54) MULTI-AUCTION USER INTERFACE

(75) Inventors: Bob Schoen, Atlanta, GA (US); Tom Davis, Norcross, GA (US); Gordon Warren, Alpharetta, GA (US); Joe Luppino, Atlanta, GA (US)

(73) Assignee: Manheim Investments, Inc., Las Vegas, NV (US)

( * ) Notice: Subject to any disclaimer, the term of this patent is extended or adjusted under 35 U.S.C. 154(b) by 313 days.

(21) Appl. No.: 11/296,260

(22) Filed: Dec. 8, 2005

(65) Prior Publication Data

US 2006/0122929 A1   Jun. 8, 2006

Related U.S. Application Data

(63) Continuation of application No. 10/882,658, filed on Jul. 2, 2004.

(60) Provisional application No. 60/699,842, filed on Jul. 18, 2005.

(51) Int. Cl.
*G06Q 40/00* (2006.01)

(52) U.S. Cl. .......................................................... 705/37

(58) Field of Classification Search .................... 705/37, 705/80; 725/9–21, 37–61, 86–105; 715/716, 715/719, 722, 756
See application file for complete search history.

(56) References Cited

U.S. PATENT DOCUMENTS

| | | | |
|---|---|---|---|
| 4,789,928 A | 12/1988 | Fujisaki | |
| 5,774,873 A | 6/1998 | Berent et al. | |
| 5,803,500 A | 9/1998 | Mossberg | |
| 6,006,201 A | 12/1999 | Berent et al. | |
| 6,118,493 A * | 9/2000 | Duhault et al. | 348/564 |
| 6,161,099 A | 12/2000 | Harrington et al. | |
| 6,202,051 B1 | 3/2001 | Woolston | |
| 6,266,651 B1 | 7/2001 | Woolston | |
| 6,415,269 B1 | 7/2002 | Dinwoodie | |
| 6,449,601 B1 | 9/2002 | Friedland et al. | |
| 6,665,649 B1 | 12/2003 | Megiddo | |
| 6,813,612 B1 * | 11/2004 | Rabenold et al. | 705/37 |
| 2001/0029478 A1 | 10/2001 | Laster et al. | |
| 2001/0032175 A1 * | 10/2001 | Holden et al. | 705/37 |
| 2001/0034697 A1 * | 10/2001 | Kaen | 705/37 |
| 2001/0037281 A1 | 11/2001 | French et al. | |

(Continued)

FOREIGN PATENT DOCUMENTS

CA   2 329 278   2/2001

(Continued)

OTHER PUBLICATIONS

Dipert, "Digital Audio Breaks the Sound Barrier", Jun. 20, 2000, EDN, 45, 15, 71, ISSN: 0012-7515.*

(Continued)

*Primary Examiner*—Mary Cheung
(74) *Attorney, Agent, or Firm*—Nixon & Vanderhye PC

(57) ABSTRACT

In a real-time auction user interface display, the user may select to participate in multiple auctions simultaneously in which case the user interface divides the display screen into different areas and displays information about an ongoing auction in each of the different display areas. The user may select which auction to display in which display area. Each of the auction display areas are updated independently based on information provided by multiple disparately-located auctions.

15 Claims, 11 Drawing Sheets

U.S. PATENT DOCUMENTS

| | | | |
|---|---|---|---|
| 2001/0044751 A1 | 11/2001 | Pugliese, III et al. | |
| 2002/0007339 A1* | 1/2002 | Hogendoorn | 705/37 |
| 2002/0032634 A1 | 3/2002 | Abrams et al. | |
| 2002/0062276 A1 | 5/2002 | Krueger et al. | |
| 2002/0082978 A1 | 6/2002 | Ghouri et al. | |
| 2002/0116315 A1 | 8/2002 | Grey et al. | |
| 2002/0116316 A1 | 8/2002 | Griffiths | |
| 2002/0116320 A1 | 8/2002 | Nassiri | |
| 2002/0123959 A1 | 9/2002 | Mozley et al. | |
| 2002/0143646 A1 | 10/2002 | Boyden et al. | |
| 2002/0174060 A1 | 11/2002 | Friedland et al. | |
| 2003/0033238 A1* | 2/2003 | Oskielunas et al. | 705/37 |
| 2003/0036964 A1 | 2/2003 | Boyden et al. | |
| 2003/0055662 A1 | 3/2003 | Collins | |
| 2003/0130966 A1 | 7/2003 | Thompson et al. | |
| 2003/0158804 A1 | 8/2003 | Francis et al. | |
| 2003/0195839 A1 | 10/2003 | Dinwoodie | |
| 2004/0107160 A1* | 6/2004 | Goclowski | 705/37 |
| 2005/0021444 A1 | 1/2005 | Bauer et al. | |

FOREIGN PATENT DOCUMENTS

| | | |
|---|---|---|
| CA | 2 326 346 | 5/2002 |
| GB | 2382162 A | 5/2003 |
| WO | WO0034899 A1 | 6/2000 |
| WO | WO03065149 A2 | 8/2003 |

OTHER PUBLICATIONS

Van't Haaf, Corey, Business in Vancouver, "It's hammer time for price-savvy buyers, B.C.'s online auctions attract buyers worldwide and offer big surprises at biddings end," Heffel.com News (Jul. 2001).

AutoTradeCenter,Inc., Industry Articles, "AutoRemarketing, Software, New Technologies: Felt in Almost All Areas of Remarketing" (Nov. 14, 2003).

Bidspotter.com—Discover Live Internet Auctions, "Participating in a BidSpotter.com Live Internet Auction Broadcast is safe, easy, and fun! BidSpotter.com has created the most comphrehensive offering for buyers and sellers available today!".

Manheim Simulcast.

International Search Report and Written Opinion issued in corresponding PCT patent application.

* cited by examiner

Example Remote Seller Auction

Example Screen Display Format

EXAMPLE SIMULCAST ARCHITECTURE

EXAMPLE SIMULCAST DATA FLOW

MULTI-AUCTION USER INTERFACE

CROSS-REFERENCES TO RELATED APPLICATIONS

This application claims the benefit of priority from application Ser. No. 10/882,658 entitled "Computer-Assisted Method And Apparatus For Absentee Sellers To Participate In Auctions And Other Sales," filed Jul. 2, 2004, and from provisional application No. 60/699,842 entitled "Multi-Auction User Interface," filed Jul. 18, 2005, which are incorporated herein by reference as if expressly set forth.

FIELD

The technology herein relates to computer user interfaces (UI's), and more particularly to computer-assisted user interface techniques for selling and/or auctioning goods and/or services via a computer network. Still more particularly, the technology herein relates to computer-assisted methods and apparatus for allowing buyers of particular goods at "live" or "simulcast" auctions broadcasted over a computer network to participate in multiple geographically-disparate auctions within a common user interface.

BACKGROUND AND SUMMARY

Anyone who has ever visited a large automobile auction facility knows that these facilities are very busy places. Several auctions take place simultaneously at such facilities. Many times, auctions will be conducted simultaneously in several different lanes. For example, in Lane One, BMW vehicles might be auctioned off by a BMW fleet dealer. The auctioneer in Lane Two might be auctioning a variety of different vehicles from a variety of different sources. The vehicles being auctioned off in Lane Three may be of another specific type, such as GMC leasing vehicles.

Sometimes, buyers are only interested in vehicles being auctioned in a particular lane. For example, a BMW dealer might only be interested in the BMW vehicles auctioned in Lane One. However, that same BMW dealer might potentially be interested in any BMW vehicles being auctioned in Lane Two. If the BMW dealer attends the live auction, he or she can simply walk from Lane One to Lane Two and back again as different vehicles the dealer is interested in come up for sale. The dealer can bid in any of the lanes and thus follow multiple. auctions all at the same time. Furthermore, an auction attendee might be attending an auction on behalf of several different dealers, and may wish to participate in different auctions simultaneously for the different dealers he or she represents.

Use of the Internet and other types of telecommunications means allow bidders and other participants to attend and bid in auctions without having to physically attend the auction. Some auctions, such as those operated by eBay, are conducted using a computer to fulfill some of the functions of an auctioneer, e.g., keeping track of bids and bidders, declaring the auction to be over, etc. Other auctions continue to be conducted by live auctioneers at an auction site, with telephone, television, the Internet or other communications means allowing remote participation and bidding. Multimedia data communications capabilities have now in some cases replaced the telephone and television to provide web broadcasting capabilities.

In an auction context, Manheim Auctions and other companies are now actively using computer network-based auction systems that provide live audio and video feeds for live auctions. In one such type of exemplary illustrative non-limiting auction system, an auctioneer and live bidders gather at a physical auction location to inspect the goods being auctioned and conduct a live auction. Remote bidders can join the auction from their homes or offices over the Internet. The remote bidders receive live audio and video feeds that provide the sights and sounds of the live auction and also allowing the remote bidders to view the goods being auctioned and auction status. Various user interfaces have been developed to allow remote bidders to closely follow the auction and understand at a glance auction status, current offer price, identification of the goods, the identity of other bidders and other auction-related information. Such systems also allow remote participants to submit bids as if they were physically present at the auction.

The ability of remote bidders from virtually anywhere to participate in the auction is advantageous for the bidders, the sellers and the auctioneer. The remote bidders benefit because they do not need to travel long distances to physically appear at the auction. The sellers benefit because they have the potential for a much greater number of participating bidders—which often results in merchandise being auctioned that is closer to fair market value. The auctioneer benefits because of increased participation—which usually means higher sales volumes and increased revenues and efficiencies.

One issue that has arisen in the past is how a remote participant can participate in multiple auctions simultaneously. The Microsoft Windows and other graphical user interfaces allow users to display different applications simultaneously in different windows. Similarly, new versions of Internet Explorer and Mozilla Firefox web browsers allow users to display different web pages in different windows. However, one of the physical limitations involved in participating in a live auction via a computer network relates to the size of the remote buyer's display screen. Typically display screens usually have display areas that are 19" diagonally or less. Generally, it is difficult for a user to position several different auction windows on a screen without one window obscuring the other so that all displayed auctions can be monitored simultaneously. Furthermore, once one brings up web browser views for two or more different auction sites simultaneously on the same computer screen, the size of the screen and the need to flip back and forth between simultaneously displayed windows (typically only one of which may be "on top" at any given time) can present a challenge to remote buyers attempting to follow multiple auctions simultaneously. In addition, it may become difficult for remote buyers to follow multiple auctions at the same time without the typically helpful video feeds that are often provided with live simulcasted auctions.

Some innovative users have found ways around this problem by investing in somewhat unconventional computer equipment. For example, it is possible to gang or otherwise physically attach together several different displays to provide a large, almost panoramic computer display capable of displaying several full size auction views on the different screens. Other users simply use several computers and associated monitors to provide a multi-auction experience. However, such investment in more expensive and extensive computer equipment that clutter desktops is generally undesirable if there are ways to provide user interfaces that make such expenditures unnecessary.

It would be desirable to provide an easy and effective user interface for remote buyers to also follow and participate in multiple auctions simultaneously. Such auctions might be in different lanes of the same auction facility, or they could be different auctions occurring anywhere—even in different parts of the country or the world.

The technology herein provides a multilane viewing capability that allows a remote participant to simultaneously participate in multiple different geographically-disparate auctions. "Geographically-disparate" may mean different lanes of the same auction facility and/or different auction facilities and/or different auction service providers.

In one exemplary illustrative non-limiting implementation, when a remote buyer has successfully logged into an auction server such as a web site, he or she has the option of selecting multiple sales in which he or she can participate (and possibly multiple dealerships to represent). Once these selections are authorized, a Multi Lane View Client allows buyers to participate in the selected auctions, dealerships and bid on vehicles just as if they were physically at each of the selected locations. The buyer can select different views on the client as items of interest become available, and have that item's pertinent information instantly. As a view is selected, the buyer will also see and hear what is currently being offered on the block at that time with the ability to submit bids to purchase that item. The buyer knows that if he/she has the highest bid, if he/she has been outbid and/or if he/she has the ability to submit another bid until the auctioneer stops the bidding on that item. More information is available by opting to leave the multi-lane view and launch a single lane simulcast application by the press of a button. The buyer can go back to the multi-lane view at any time and resume participating in the pre-selected auctions.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Example Overall Auction System

Figure 1:
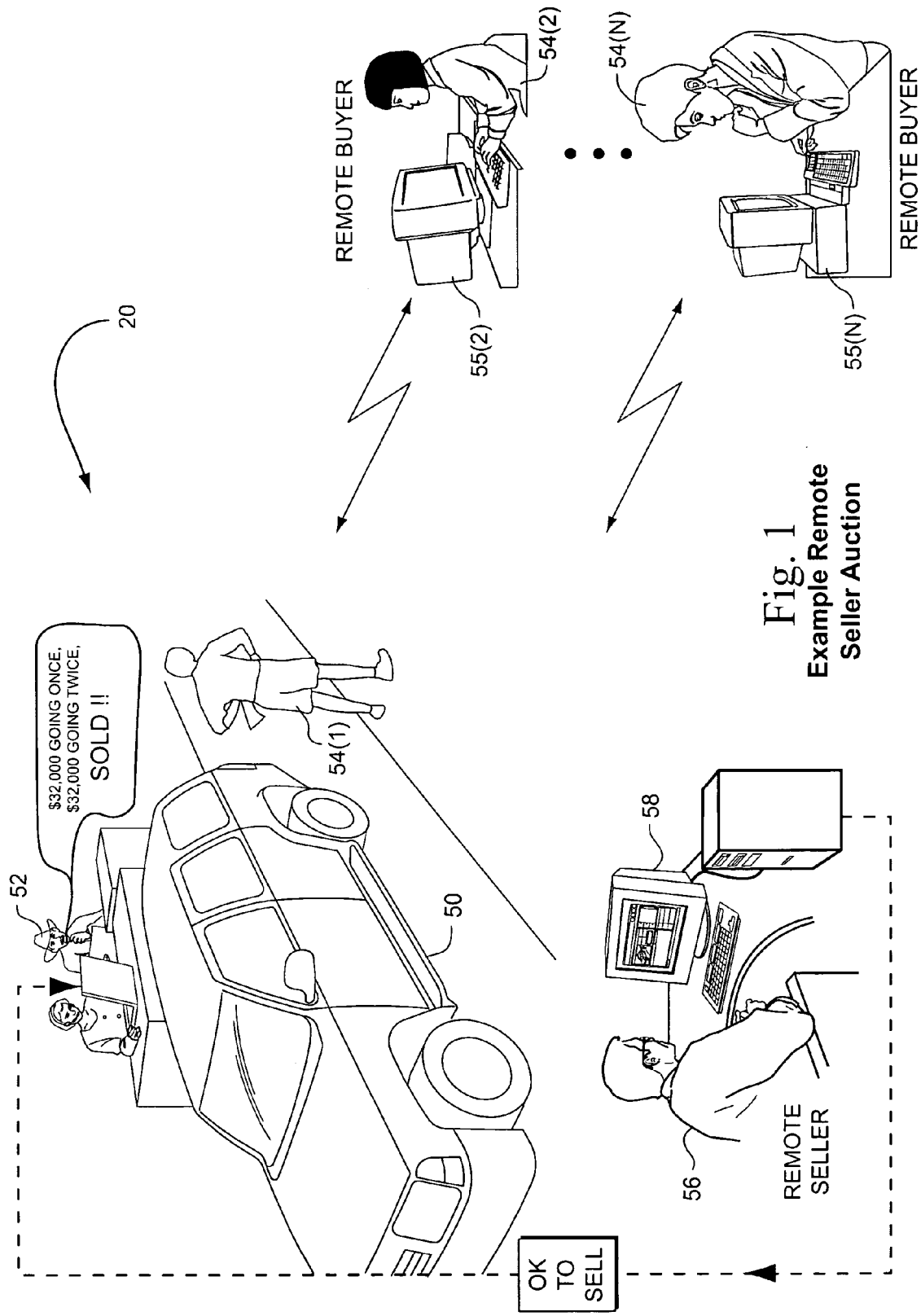
FIG. 1 is a schematic diagram of an overall exemplary illustrative non-limiting auction/sale implementation.

FIG. 1 shows an example overall illustrative non-limiting implementation of an auction/sale transaction system 20. In the example shown, an item 50 to be auctioned or sold is placed on the auction "block" for viewing and inspection by potential bidders. Item 50 is a motor vehicle such as a car in the particular example shown, but any sort of item could be exhibited for sale. Example items 50 could include cars, boats, trucks, motorcycles, marine equipment, real estate, art works, jewelry, collectibles, furniture, new or used industrial equipment, horses, other animals, plants, food items, financial instruments, any types of services, or just about anything else you can think of that may be bought and sold.

In the illustrative non-limiting example shown in FIG. 1, an auctioneer 52 administers the transaction by accepting bids from bidders 54 and encouraging bidders to out bid one another in order to achieve a highest bid. In the particular illustrative non-limiting example shown, the auctioneer is a human being physically located at the "block" and thus co-located with the item 50 to be sold. However, in some implementations, the role of auctioneer 52 could be implemented in whole or in part by a computer program and/or the responsibilities of auctioneer could be divided between a computer program and a human being. In some instances, the auctioneer 52 might be located remotely from the item 50 being sold as opposed to being physically co-located with the item.

In general, the responsibility of auctioneer 52 in the illustrative non-limiting exemplary implementation is to conduct the auction—meaning that the auction takes place within a certain time period (which may be extendable) during which all bids are submitted to be considered. In other non-limiting illustrative exemplary implementations, different arrangement might be possible or desirable. For example, other types of auctions begin and end at predetermined times, and there are still other auction types that hybrids of these types of timing features.

In the example shown in FIG. 1, bidders 54 may be physically present at the auction "block", or they may be connected remotely to the auction via a so-called "simulcast" connection. Remote bidders 54 may be using Internet browsers with appropriate multimedia plug-ins to receive live video/audio feeds so they can see and hear the auctioneer 52 as well as inspect the item 50 and also watch live bidders 54 on site submitting their bids. The "live" dimension of the exemplary non-limiting auction provides a degree of excitement, urgency and reliability that may not necessarily be easy to entirely duplicate or simulate when conducting a "virtual" auction in cyberspace. However, different dynamics and experiences may be acceptable in different contexts. For example, some "cyberspace" auctions provide audio and/or video feeds in an attempt to simulate the excitement and atmosphere of a live auction.

Such exemplary non-limiting simulcast features extend the physical auction experience onto the Internet by
   allowing dealers to participate in auction sales remotely;
   providing audio and video of the live auction;
   allowing dealers to bid on and purchase vehicles as though they were standing in the lane.

Simulcast offers participants access to physical auctions from a remote location. It allows participants to participate in auction sales that they normally would not, due to for example:
   geographic location,
   a scheduling conflict,
   inability to leave the dealership or other place of business,
   need to reduce travel related expenses.

Simulcast also allows participants to monitor the activity in the marketplace.
   Example steps for using simulcast are:
   login to simulcast,
   watch and listen to the sale,
   monitor the bidding activity,
   bid on items of interest, purchase items, receive sale confirmations via fax or other means, return the confirmations to the auction with signature, payment information, and transportation information, remit payment, receive title and possession of item.

Exemplary non-limiting features of the simulcast buyer window include:

1. Audio and video allow users to see and hear the live physical auction from a remote location.

2. Item information. In the case of motor vehicles, shows the vehicles' year, make, model, VIN, color, mileage, installed options, seller, and announcements. Also displays vehicle light status (light definitions may vary from auction to auction).

3. Auction log. In addition to listening to the auctioneer, users can view the bidding activity in the AuctionLog on the simulcast screen.

4. Bidding controls. The bidding controls allow users to place bids and to view the current high bid. Click on the "bid" button to place a bid on the current vehicle at the current asking price.

5. Vehicles purchased. This box will track the number and dollar amount of items purchased in the lane users are viewing. If a bidder purchases an item via simulcast, in addition to hearing the auctioneer announce the purchase, the bidder can view your bidder number and rep name in the AuctionLog.

FIG. 1 also shows an example remote or absentee seller 56 participating in the transaction from a remote location. In the example shown, remote seller 56 uses a Internet-enabled appliance such as for example a personal computer equipped with an Internet browser and appropriate multimedia plug-ins to communicate with the auction/sale process. In other example arrangements, the remote seller 56 might use a cellular telephone, a personal digital assistant, or any other appliance providing connectivity. In the example shown, the desired connectivity permits the remote seller 56 to receive and see and hear a live multimedia audio/video feed from the auction location, but other types of contexts may rely on live video only, live audio only or data reporting without the need for live multimedia.

Example User Interface

Figure 2:
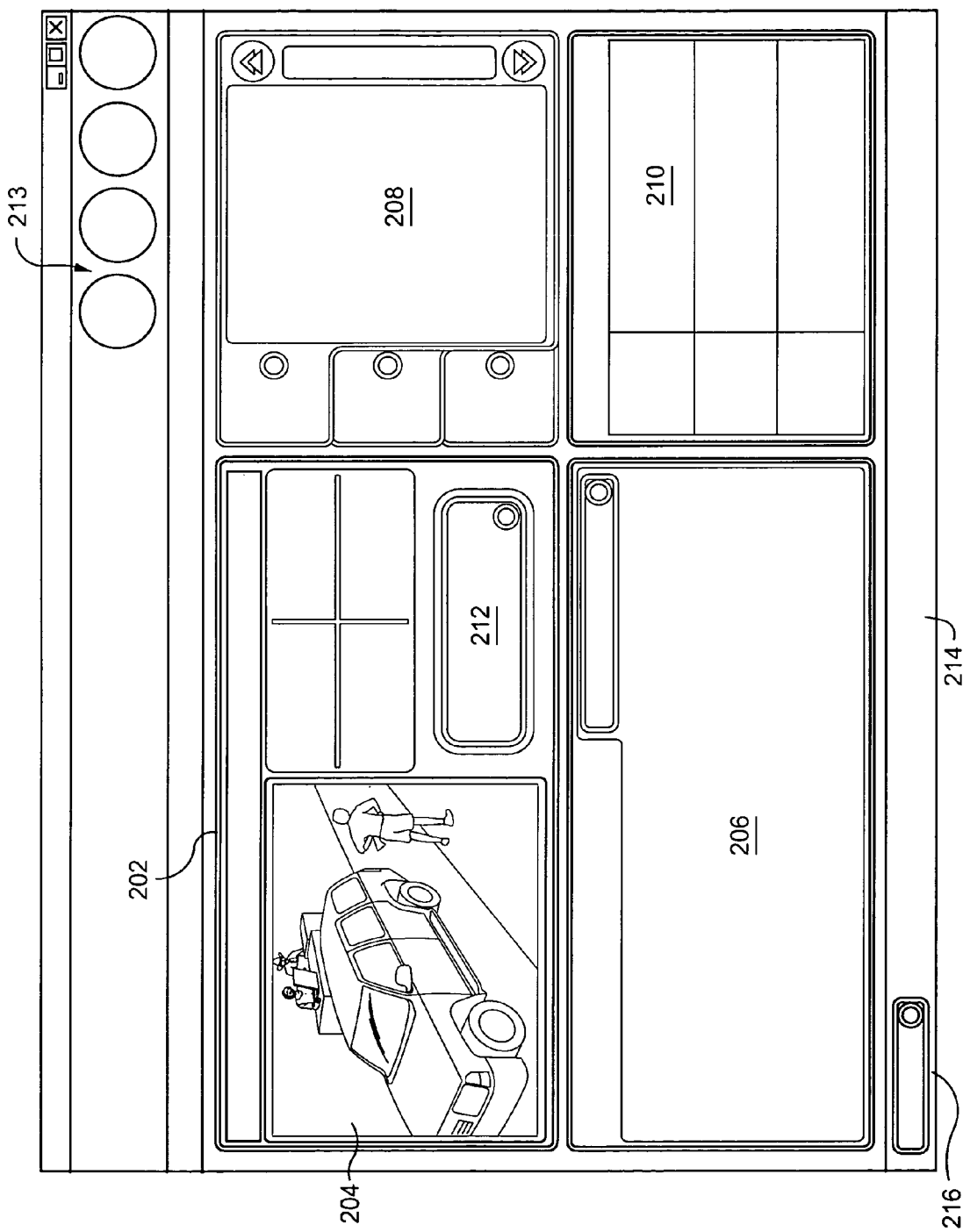
FIG. 2 shows an example illustrative non-limiting screen display format.

FIG. 2 shows an example single auction screen display that remote participants (e.g., remote buyers 54 and remote sellers 56) see displayed on their appliances 55, 58 during an example auction/sale. The display shown is divided into four exemplary areas:

a main status area 202 including a live-action video display 204;

a vehicle information display section 206;

a supplemental information display section 208; and a "next item" display section 210.

Figure 3:
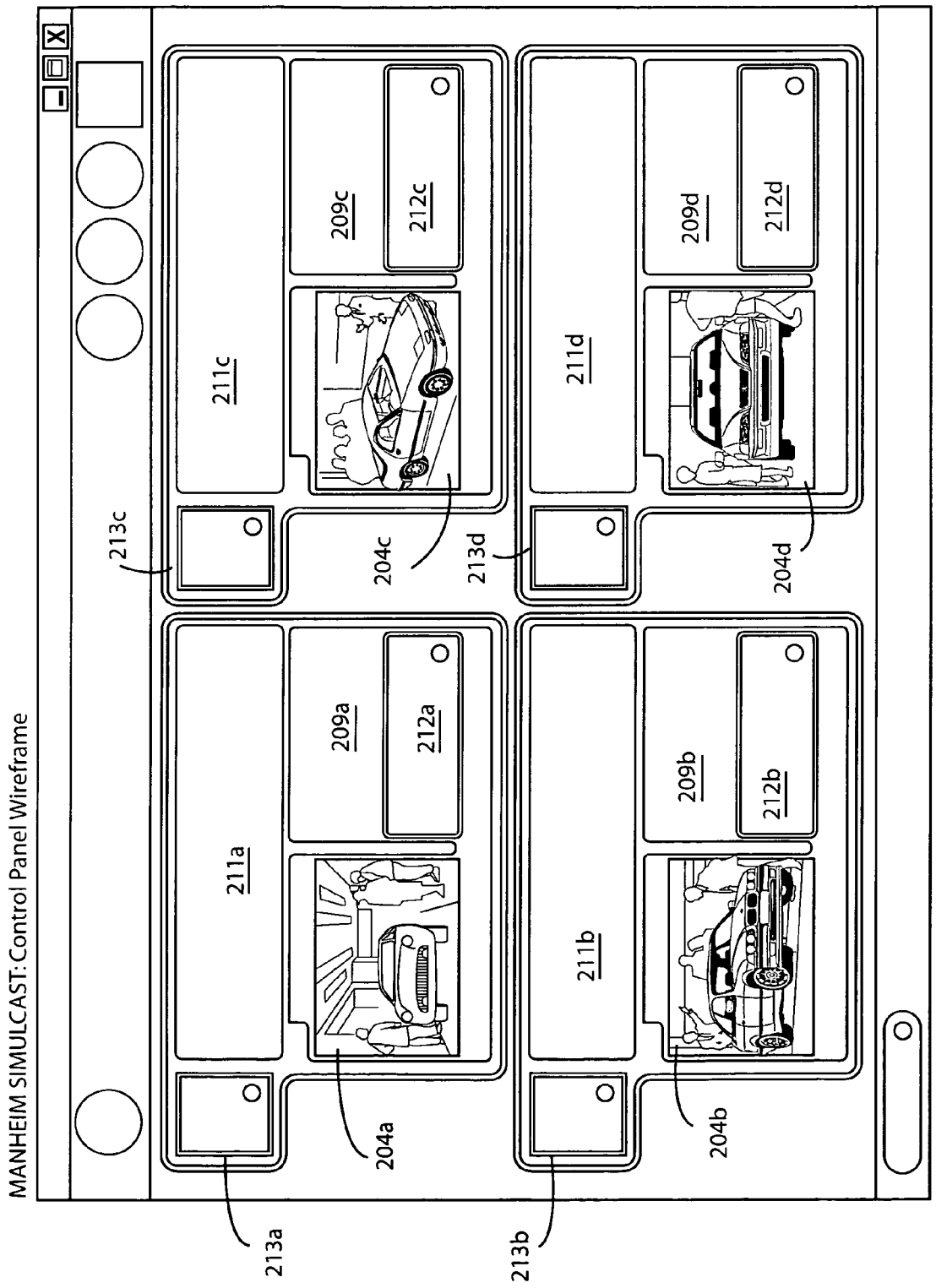
FIG. 3 shows an example illustrative multi-auction display format.

In the example shown, the main information section 202 provides information about what is going on right now in the auction/sale. The live action video display 204 displays what's going on at the auction site so that the seller 56 and buyers 54 can see the item currently being sold, watch the auctioneer 52 and any buyers 55 who are participating on-site, etc. A corresponding audio feed allows remote buyers 54 and remote sellers 56 to hear the auctioneer 52 and any other exchanges going on at the auction. The live video display 204 presented on the remote user's computers 55, 58 allows the remote users to feel like they are present at the auction and have more or less complete information about what is going on. This takes the mystery out of remote participation and may also add the feeling of excitement and time pressure that anyone has ever been to a live auction has experienced. The main display 202 also provides additional information including the current high bid amount, the identity of the current high bidder and very clear information identifying the item that is currently on the block. A bid history display shown in supplemental portion 208 shows the entire history of bidding for the current item including all bids submitted and auctioneer comments. Remote users 54, 56 can scroll down this bid history during the sale to reference entries that occurred earlier in the auctioning of this particular item. The item description field 206 provides detailed information about the item currently being sold including identification information, any disclaimers or notes, etc. In addition, the page shown in FIG. 3 provides status lights in the upper right-hand corner of the display that gives quick-glance status information on the sale of this particular item. Users learn to recognize the stage of the sale simply by viewing the status lights. For example, if the auctioneer is getting to accept the highest bid to sell the item, the particular status light indicates this and so any buyers 54 who are holding back immediately understand that if they do not submit their bid now it will be too late (and remote sellers can get ready to make a decision as to whether to accept the bid).

FIG. 3 shows an example new user interface for use in presenting multiple auctions to a remote participant simultaneously. FIG. 3 shows an exemplary illustrative non-limiting example of user interface technology providing a plurality (e.g., in this case four) different auction presentation areas simultaneously within the same web page or other display format. These different screen areas in the exemplary illustrative non-limiting implementation can provide auction status, bidding, informational and other features for different lanes of the same auction facility, or different auctions located anywhere in the world. Each of the different auction displays shown in the drawing is updated independently in the exemplary illustrative non-limiting implementation to provide real time informational and progress information on each of the various ongoing auctions.

In the illustrative exemplary non-limiting implementation shown, each of the four auction display areas of the user's display screen is provided with certain display features that allow the user to follow and participate in the corresponding auction. Such features in the exemplary illustrative non-limiting implementation include for example:

an auction display including a live video display area 204, a "bid" button 212, high bid information 209, status/identification information 211, and a "go" button 213.

In the example shown, selecting the "bid" button submits a bid in the corresponding auction. Hence, in this particular exemplary non-limiting illustrative implementation, it is possible for the user viewing the single screen shown in FIG. 3 to submit bids in four different auctions taking place in four different locations. The display fields 204, 209 and 211 generally give the user sufficient information to allow him to place a bid in the correct sequence and have the bid accepted. However, if the user wants more detailed information concerning a particular auction, he may select the "go" button 213 for the corresponding auction and a more detailed single-auction display screen of the type shown in FIG. 2 will be displayed for that particular auction. Selecting a "back" button 216 on the FIG. 2 format would in that instance return the user to the multi-lane display of FIG. 3.

The example shown in this particular FIG. 3 of four different simultaneous auction displays is illustrative only—other implementations might include two, three, five, six, eight or any number of simultaneous displays consistent with the resolution of the participant's display device.

Figure 4:
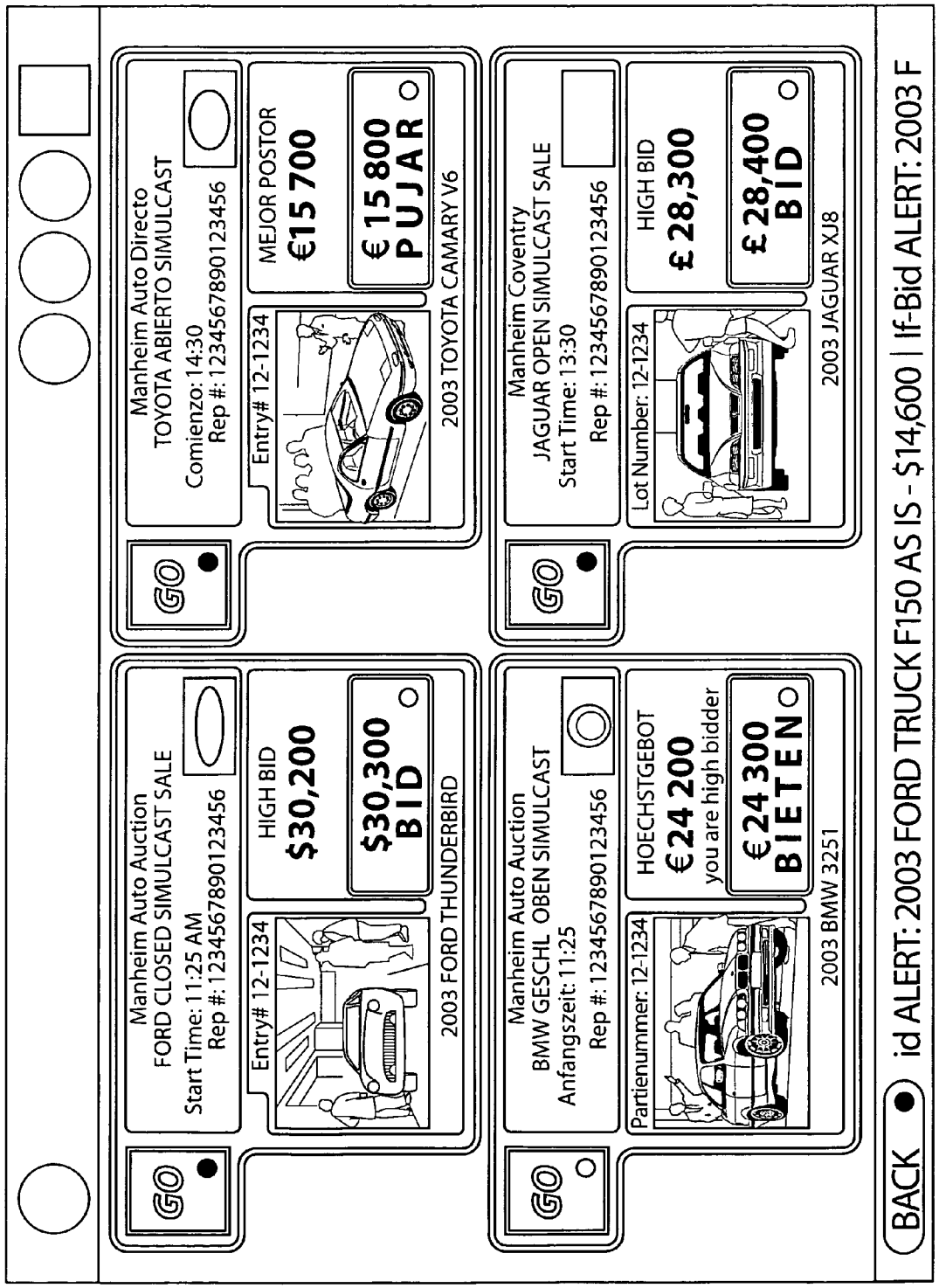
FIG. 4 shows an example illustrative more detailed multi-auction display format.

FIG. 4 shows additional detail of one exemplary illustrative multi-lane or multi-auction non-limiting user interface. This drawing shows four different auctions in four entirely different geographical locations. The auction in the upper left-hand corner display is a Ford closed simulcast sale conducted by Manheim Auto Auction at a certain auction location. The display in the lower left-hand corner shows the status of a Manheim Auto Auction conducted in Germany. The display in the upper right-hand corner displays information about an auction being performed in Argentina or other Spanish-speaking country. The lower left-hand corner display shows a Jaguar open simulcast sale proceeding in the United Kingdom. This drawing thus illustrates that the auctions that can be displayed simultaneously may be in entirely different geographical locations anywhere in the world. Different auction panels can thus, in this exemplary illustrative non-limiting implementation, display auction information in different currencies and/or different languages.

As can be seen from FIG. 4 in the illustrative exemplary non-limiting implementation, each of the four auction display panels has a similar layout and format including the following features:

Informational bar including auction name, auction sponsor, start time and representative as well as a logo;
Interactive live video feed display showing vehicle or other item identification number or other information;
A "high bid" informational display showing the current high bid in appropriate monetary units;
A "bid" button showing the next bidding increment (the user will select and activate this button if he or she wants to submit a bid at the next bid increment price);
A "go" button; and
An additional informational line.

Figure 5A:
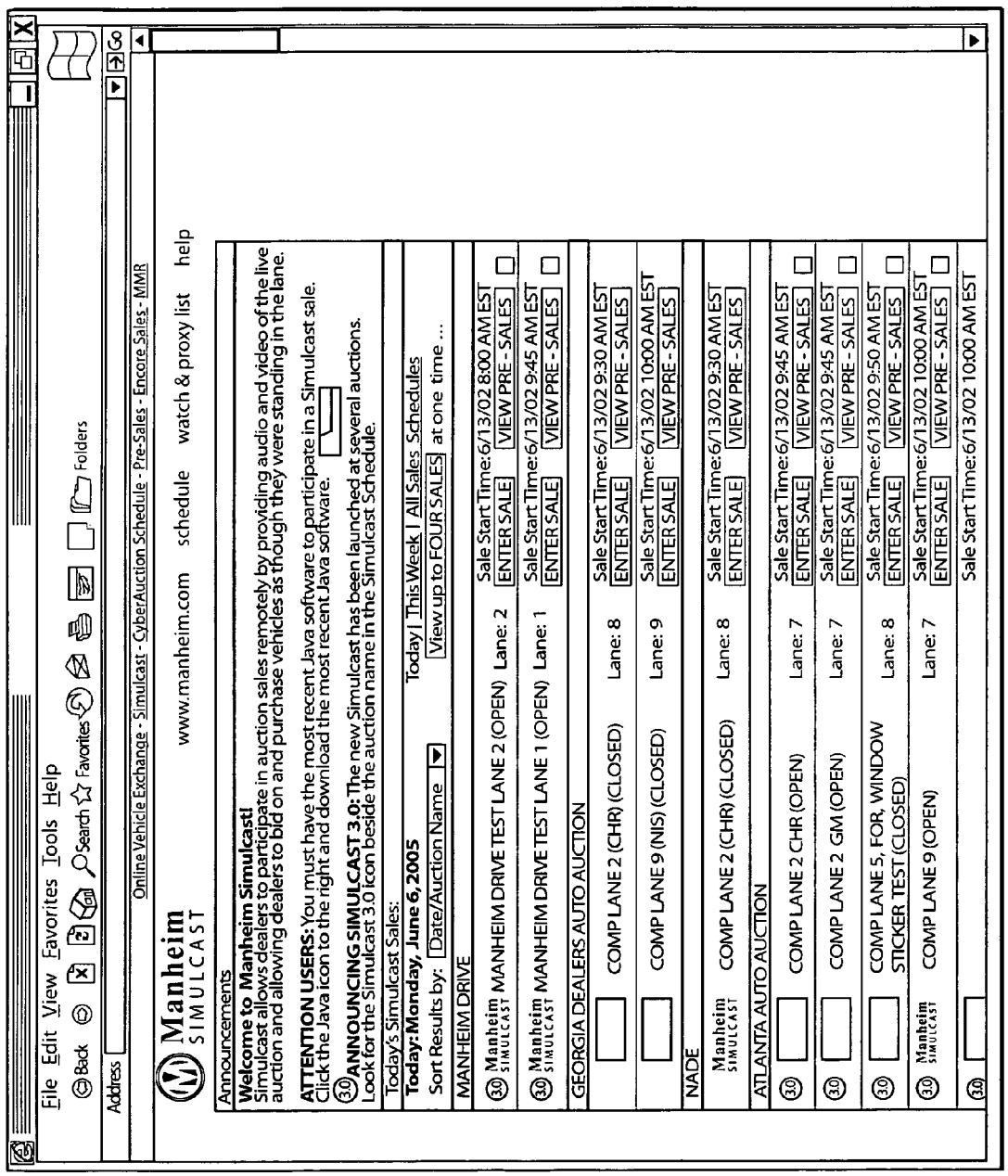
FIGS. 5A, 5B show example selectable auction search results.
Figure 5B:
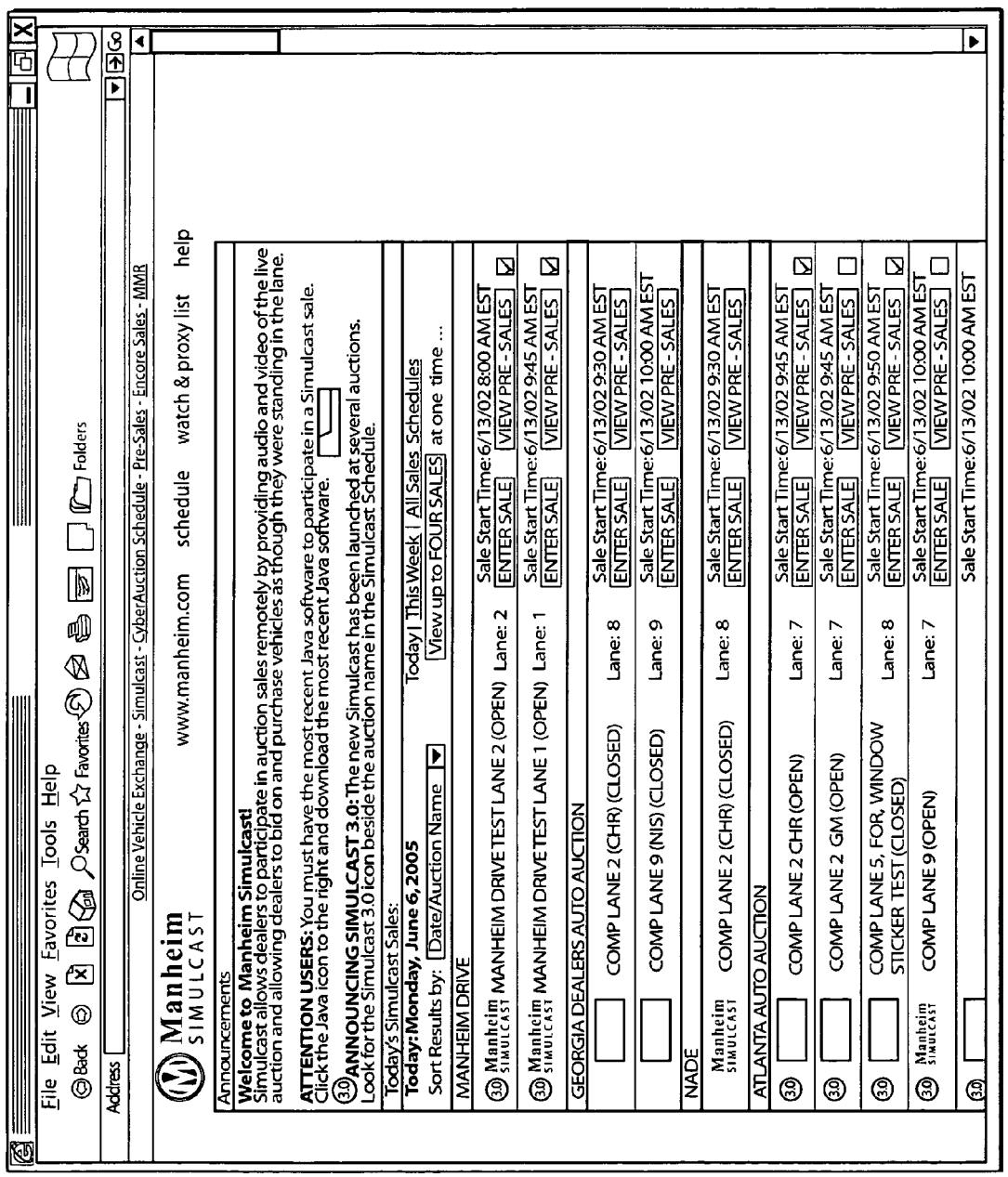

In the exemplary illustrative non-limiting implementation, to select the different auctions to display within the various different panel displays, the participant may perform a search on upcoming auctions to display an exemplary illustrative non-limiting listing such as that shown in FIGS. 5A, 5B. The user may then select from of these listed auctions for participation by simply performing a mouse click over the desired auction. The user may perform this operation multiple times to select additional auctions to simultaneously display in the multiple auction display interface described previously.

Figure 6:
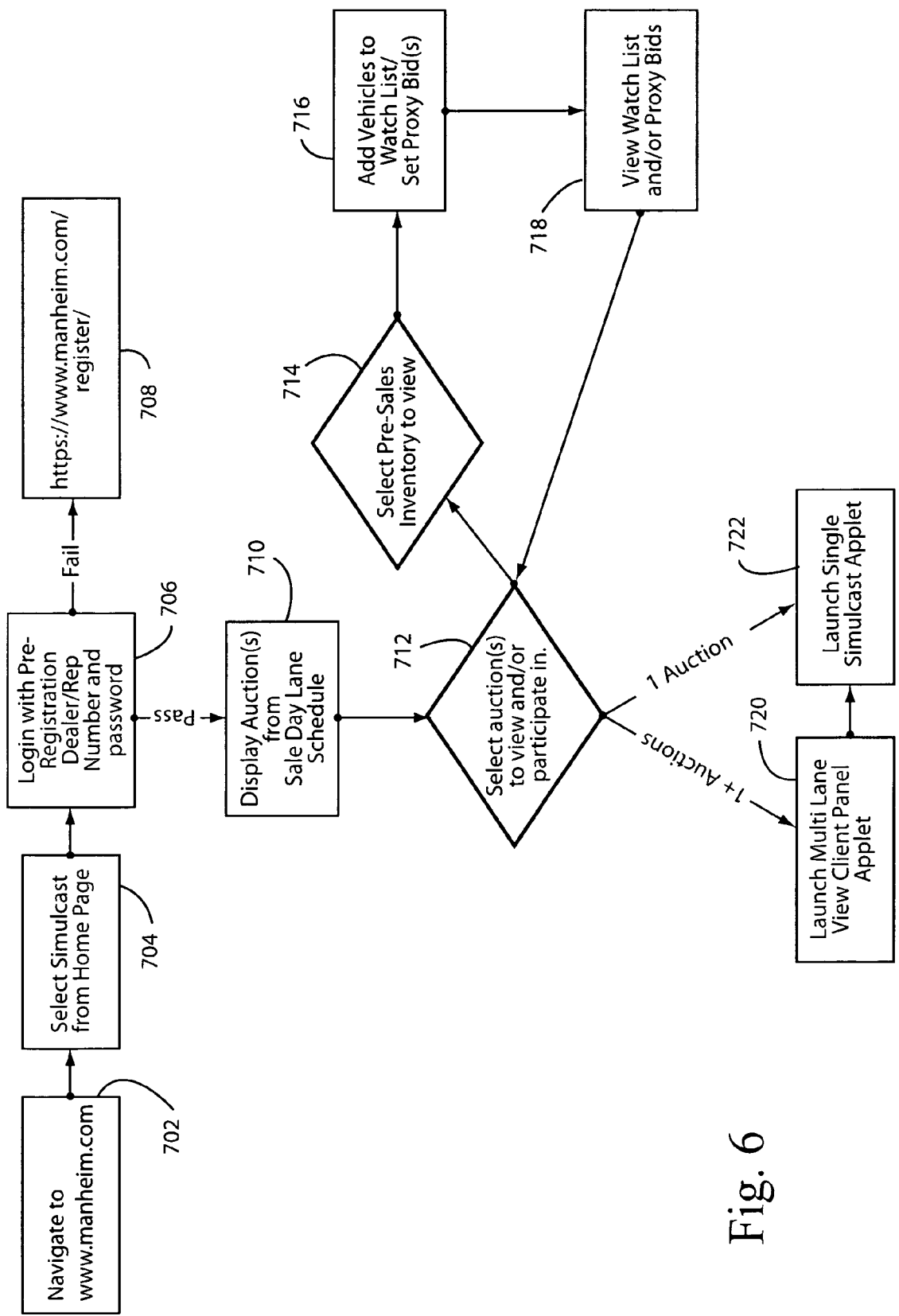
FIG. 6 is a flowchart of example illustrative non-limiting control steps.

The exemplary illustrative non-limiting flowchart shown in FIG. 6 provides additional detail. In this example, a participant interested in participating in multiple auctions navigates to an appropriate web site on the World Wide Web of the Internet (block 702), and then selects a simulcast auction home page (block 704). The user then logs in with pre-registration dealer/representative information and associated password (block 706). If the user's pre-registration information is not authenticated, the process fails (block 708). Otherwise, the user is allowed to display a list of auctions from the sale day lane schedule (block 710). The user may then select auctions to view and/or participate in (block 712). The user may select a presales inventory to view in any of the selected auctions, add vehicles to a watch list, set proxy bids and/or view a watch list and/or proxy bids (blocks 714, 716, 718).

If the user selects only a single auction in the exemplary illustrative non-limiting implementation, a single simulcast auction viewing applet is launched to provide a full-screen view of that single auction (block 722). If, on the other hand, the user selects more than one auction to participate in simultaneously, the exemplary illustrative non-limiting system launches a multi-lane view client panel applet as described above that allows the user to display more than one auction simultaneously (block 720). In the exemplary illustrative non-limiting implementation, the multi-lane view may provide up to four different auction displays simultaneously. However, in other implementations, different numbers of simultaneously displays can be provided, where the number of auction displays provided may depend on the number of auctions the user requests participation in.

Once the user interface has been launched, the user may then freely switch between different auctions simply by moving his or her cursor over the appropriate associated auction display panel and operating the button therein. When one or more of the auctions has terminated, the user may depress the "back" button to select additional auctions to launch and display. The user can also freely move between the multi-auction display and a more detailed display pertaining to a single auction by, for example, selecting the "go" and "back" buttons.

Exemplarly Non-Limiting Illustrative Architecture

Figure 7A:
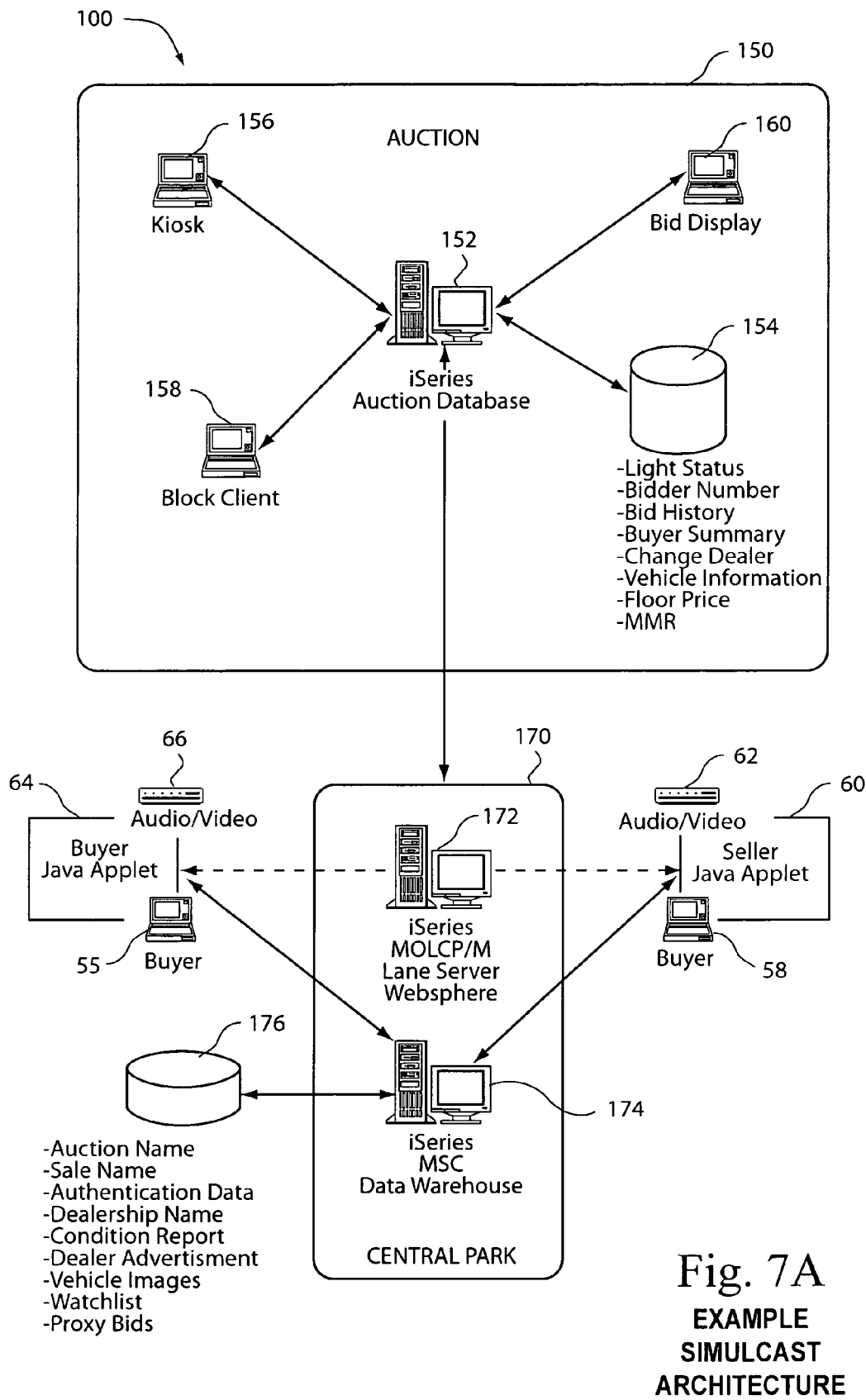
FIG. 7A is a schematic illustrative of an exemplary illustrative non-limiting simulcast architecture.

FIG. 7A shows an exemplary illustrative non-limiting simulcast architecture 100 that may be used to implement the system 20 shown in FIG. 1. In the particular FIG. 7 implementation shown, architecture 100 includes an on site auction installation 150, a centralized data system 170, a remote seller appliance 58 and a remote bidder appliance 55. As shown in FIG. 7A, the remote seller appliance 58 may include a personal computer or any other appliance having an indication means, an input means and a communications means. In this particular non-limiting example, the remote seller appliance may include a personal computer with an Internet browser of conventional design that displays HTML, XML and other Internet type data and World Wide Web pages, such browser may use or be compatible with conventional http and https Internet protocols and conventional multimedia data transmissions protocols such as RTP based upon various well known Internet standards. In the example shown, a seller java applet 60 is downloaded to the seller appliance 58 on demand, this java applet providing certain display, interactivity and other capabilities supplied by the centralized data system 170. In the example shown, the seller appliance 58 also includes audio/video reproduction capabilities 62 including for example real time video display capability and real time audio feedback capability. In some examples, the audio/video could be interactive two-way (i.e., the seller appliance 58 can both send and receive images and audio), whereas in other contexts it may be sufficient to receive audio and video feeds from the auction site 150 and provide feedback via data inputs only. In still other contexts, the remote bidder 58 may be able to interact in a variety of different ways including for example audio feedback only, constrained or unconstrained data input, telephone contact, or other arrangements.

Also as shown in exemplary FIG. 7A, the buyer appliance 55 may also include buyer Java applet 64 and an associated audio/video reproduction capability 66.

The centralized data system 170 in the example shown may include a web server 172 and a data warehouse 174 having access to a database 176. The database 176 may store detailed information about various transactions/sales including for example:

auction name,
sale name,
authentication data,
dealership name,
condition report,
dealer advertisement, vehicle images,
watch list,
proxy bids,
other.

In the example shown, the central system 170 may communicate with both the seller appliance(s) 58 and the buyer appliance(s) 55 via data communications paths including but not limited to the Internet. The buyer and seller appliances 55, 58 may also communicate directly with the data warehouse 174. In one exemplary illustrative non-limiting implementation, data warehouse 174 and/or web server 172 downloads applets 60, 64 to the appliances 55, 58. These applets then draw on different types of information from web server 172 and data warehouse 174 in order to provide comprehensive informative auction status and other displays for display to the bidders 54 and sellers 56. In the example shown, the bidders 54 and sellers 56 receive different types of displays, with the central installation 170 first authenticating users and then sending appropriate information to appropriate users depending upon their role in the transaction.

As also shown in FIG. 7A, the onsite auction installation may include a local database 152 having access to a variety of local data 154 including for example the following:
light status,
bidder number,
bid history,
buyer summary,
change dealer,
vehicle information,
floor price,
MMR,
other.

The local database 152 may provide this information for display by various local devices including a kiosk 156, a block client 158 and a bid display 160. The block client 158 may, for example, be operated by auctioneer 52 or an assistant to the auctioneer (e.g., a block clerk who is responsible for communicating the high bid to the seller and prompting the consignor to approve or reject the high bid—the block clerk also aids in communicating the seller's decisions to the auctioneer). Kiosk 156 may be a walkup interactive appliance at the auction site that local bidders or sellers may use in lieu of raising their hands or otherwise participating live in the auction. Bid display 160 may provide informative information to all viewers and may in one example be a large-size display such as for example a billboard or other large video screen.

Figure 7B:
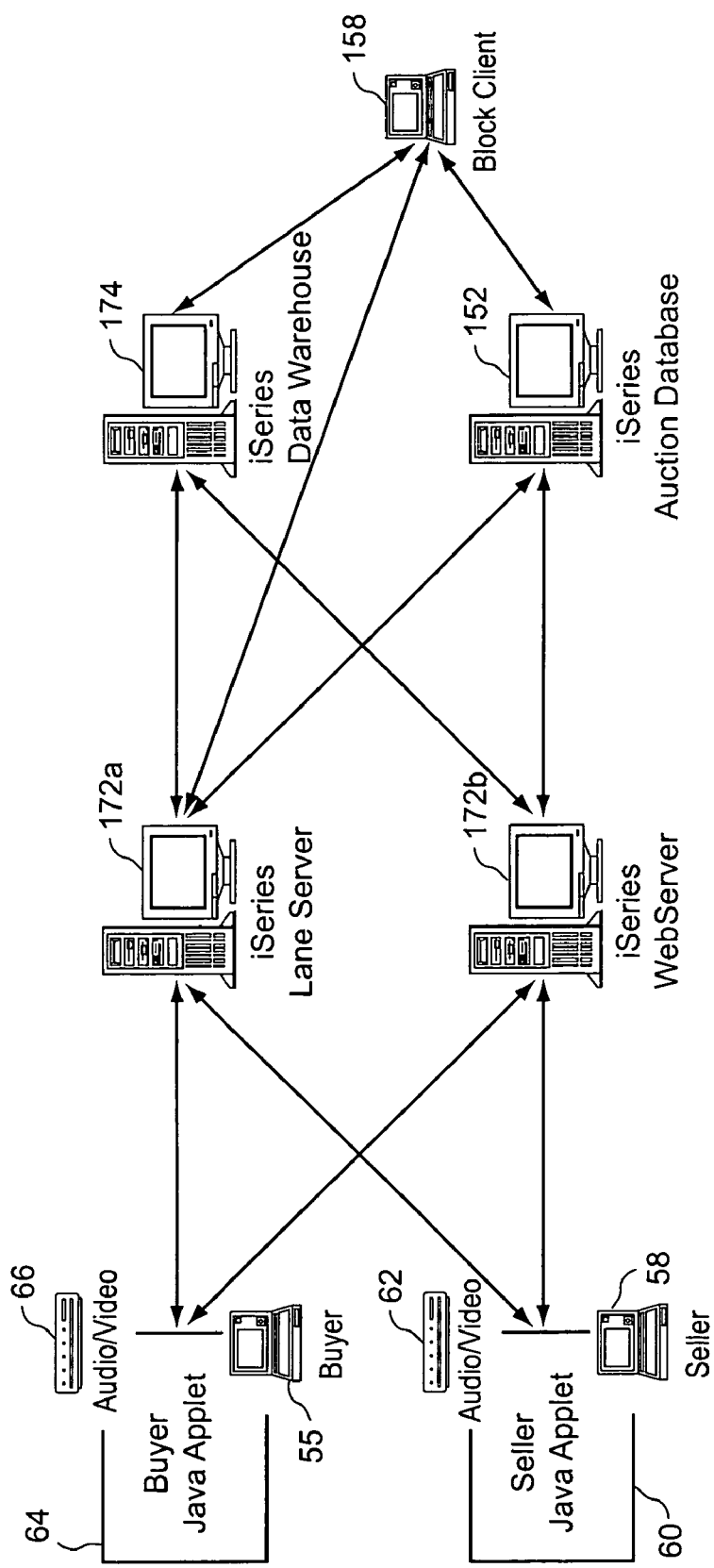
FIG. 7B is a schematic illustration of an exemplary illustrative non-limiting simulcast data flow.

FIG. 7B shows an example simulcast data flow showing how different parts of the FIG. 7A architecture interact with one another. In the example shown, the buyer and seller appliances 55, 58, respectively, in general communicate with an intermediate architectural layer provided by the lane server 172a, web server 172b—and these 172 components then communicate with the "back end" which in the example shown comprises the data warehouse 174, the auction database 152 and the block client 158. In more detail, the block client 158 communicates with the data warehouse 174, the auction database 152 and the lane server 172a (which is part of the lane server/web server 172 shown in FIG. 7). The data warehouse 174, in turn, communicates both with the block client 158, the lane server 172a, and the web server 172b. The auction database 152 communicates with a block client 158, the lane server 172a, and the web server 172b. The lane server 172a communicates with the data warehouse 174, the block client 158, the auction database 152, the buyer Java applet 64, and the seller Java applet 60. The web server 172b communicates with the buyer appliance 55 and associated applet 64, the seller appliance 58 and associated seller Java applet 60 (in fact, in the exemplary arrangement, it is the web server 172b that downloads those applets to the buyer and seller appliances 55, 58, respectively), as well as with the auction database 152 and the data warehouse 174.

Figure 7C:
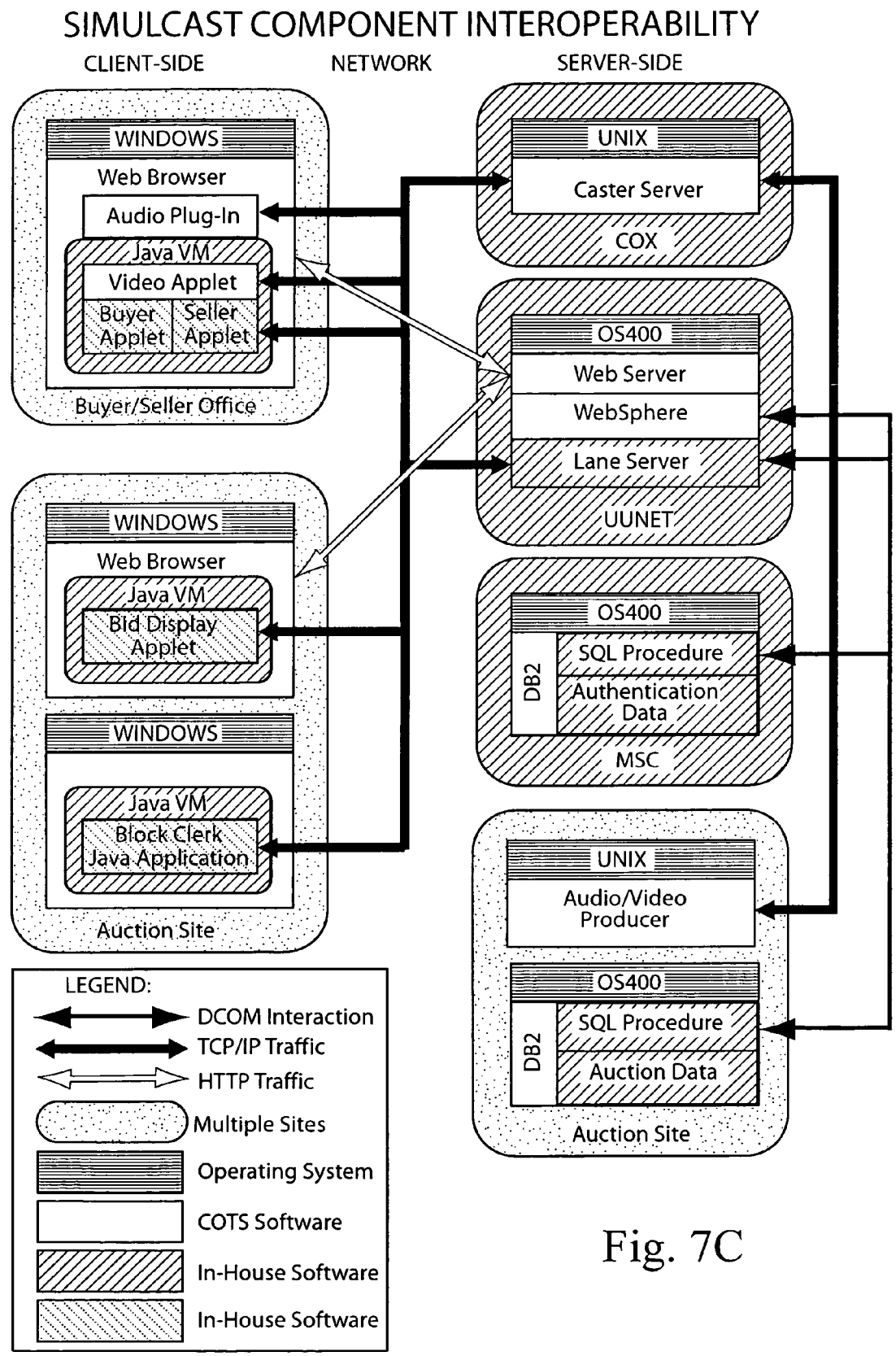
FIG. 7C is a schematic illustration of exemplary illustrative non-limiting component interoperability architecture.

FIG. 7C shows an exemplary illustrative non-limiting simulcast component interoperability diagram for an exemplary illustrative non-limiting implementation. The overall exemplary illustrative non-limiting auction system includes a client side and a server side coupled together via a network. The client side functionality includes both buyer/seller office installations and auction site installations in this exemplary illustrative non-limiting implementation. There may be multiple buyer/seller office installations and multiple auction site installations. The client side buyer/seller office implementation shown includes a Windows-based computing and display equipped with a web browser and an audio plug in. A Java virtual machine is used to execute a video applet to provide live video. A buyer applet and/or seller applet may be running depending upon who the participant is.

The client-side auction installation may include two different computing devices: a web browser based auctioneer appliance including a bid display; and a block clerk java application running within a Java virtual machine.

The server side exemplary illustrative non-limiting architecture may include various servers including a caster server, one or more web servers, a database server, and auction site installations including audio/video producers, local database management and auction data.

In one exemplary illustrative implementation, the client side functionality throttles back on the video frame rate for each of multiple auctions when the user selects the multi-lane view, in order to reduce bandwidth requirements.

Figures 8A, 8B:
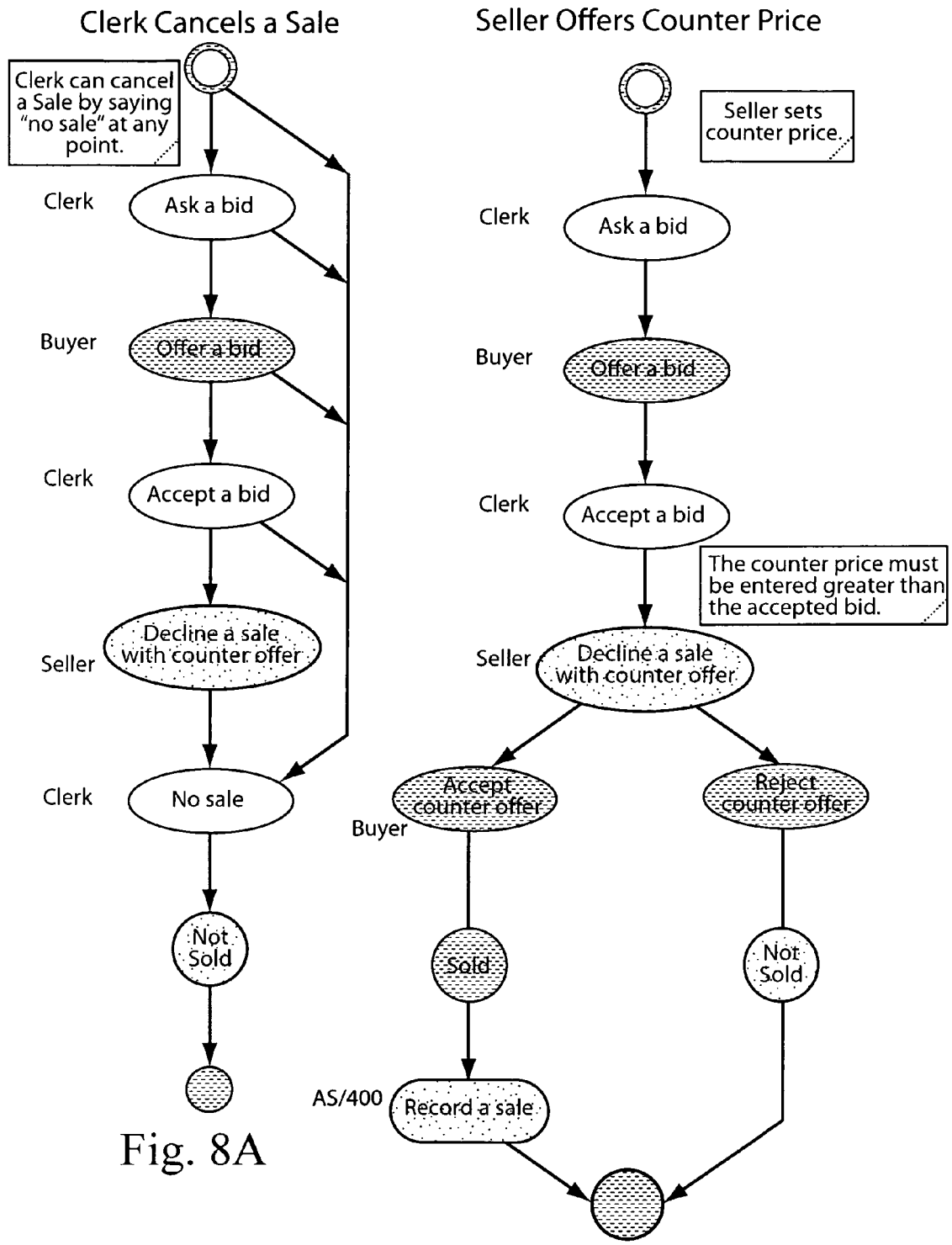
FIGS. 8A and 8B show exemplary illustrative non-limiting auction flow diagrams.

FIGS. 8A and 8B shows exemplary illustrative non-limiting additional auction implementation flowcharts. In the exemplary illustrative non-limiting implementation flowchart shown in FIG. 8A, a clerk may cancel a sale by saying "no sale" at any point. In this exemplary illustrative non-limiting implementation, the clerk may "ask a bid" and the buyer may "offer a bid." The clerk may "accept a bid", or the seller may "decline a sale with counteroffer." In exemplary implementation shown, the clerk may also "no sale" the sale at any point which causes the item to not be sold.

As shown in FIG. 8B, a remote seller may offer a counter price by setting a counter price. In the flowchart shown, once the seller declines a sale with a counteroffer, the buyer may either accept the counteroffer or reject the counteroffer. If the buyer accepts the counteroffer, the item is sold at the counteroffer price and a sale is recorded. If the buyer rejects the counteroffer, the item is not sold.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We Claim:

1. Using a computer network based auctioning system, a method of allowing a user to participate in multiple remotely located auctions simultaneously comprising:

sending a user a list of live auctions for display on a user's computer comprising a processor, a display and at least one input device, enabling the user to select, with said at least one input device and said user's computer, one or more auctions to participate in from the list of auctions;

receiving the user's selection from said user's computer over the computer network;

when the received user selection selects only one auction to participate in, sending, to the user's computer over the computer network, information to support the user's computer launching a single auction view user interlace for display of auction related data and sending, to the user's computer over the computer network, a live video feed for said single selected auction; and when the received user selection selects more than one auction to participate in simultaneously, sending, to the user's computer over the computer network, information to support the user's computer launching a multi-auction display user interface web page for display of live video feeds from multiple auctions within different panes of said multi-auction display user interlace web page, and sending and routing, to the user's computer over the computer network, a first live video feed from a first live auction and also simultaneously sending and routing, to the user's computer over the computer network, a second live video feed from a geographically-disparate second live auction different from said first live auction, including adjusting, at least in part in response to receipt of signals indicating the user has currently selected one of said first and second simultaneously-proceeding live auctions, the video frame rate delivered to the user's computer for at least one of said first and second live video feeds corresponding to the currently-selected one of said first and second simultaneously proceeding live auctions, to provide a higher video frame rate for the auction the user has currently selected while accommodating bandwidth requirements.

2. The method of claim 1 wherein each of said multiple auction related display areas includes live video, live audio and live data.

3. The method of claim 1 wherein at least one of the multiple displayed auctions also includes live audio.

4. The method of claim 3 including enabling the user to select which of multiple simultaneously displayed auction panels the live audio is to correspond with, and delivering the associated live audio feed to the user's computer.

5. The method of claim 1 wherein said throttling includes decreasing the frame rate of each live video display for each of the displayed auctions when the user selects to display plural auctions simultaneously.

6. The method of claim 1 including enabling the user to select which of multiple auctions to bid in by moving a cursor to an appropriate corresponding portion of the display screen and selecting the appropriate bid button.

7. The method of claim 1 wherein, upon display of plural auction panels, providing for each of said plural auction panels an associated bid button and an associated live video display, and updating the video displays for each of the auction panels independently to enable the user to bid in plural simultaneous live auctions.

8. The method of claim 1 wherein the plural auctions are geographically disparately located.

9. The method of claim 1 wherein said first and second auctions are located in different lanes of the same auction facility.

10. The method of claim 1 wherein said first and second auctions are located in different parts of the world.

11. The method of claim 1 including enabling the user to operate a common user input device to provide participation in any of said plural auctions.

12. The method of claim 11 wherein said common user input device includes a mouse pointing device.

13. The method of claim 11 wherein said common user interface device includes a touch screen.

14. The method of claim 11 wherein said common user input device comprises a keyboard.

15. A server coupled to a computer network, said server allowing a user to simultaneously participate in multiple remotely located auctions by simultaneously monitoring each of said multiple remotely located auctions over the computer network, said server comprising:

a processor coupled to said computer network, said processor receiving data from a computing device associated with the user and connected to the computer network, said received data indicating user selection of one or more auctions to participate in from a list of auctions; and a data router and transmitter coupled to said processor, said data router and transmitter sending, to the computing device associated with the user over the computer network, information to support the user launching a single auction view user interface and displaying auction related data including a live video feed from said single auction therein when the user selects only one auction to participate in, said data router and transmitter sending, to the computing device associated with the user over the computer network, user information to support the user launching a multi-auction display user interlace web page and displaying live video feeds from multiple auctions within corresponding multiple panes of said web page when the user selects plural auctions to participate in simultaneously, said data router and transmitter including a router that routes to the computing device associated with the user over the computer network, a first live video feed from a first live auction and also simultaneously routes to the user a second live video feed from a second live auction different from said first live auction, said router automatically adjusting the transmission rate of at least one of said first and second live video feeds to enable faster live auction video transmission for display within a user-selected one of said multiple auction panes in response to user selection of said pane.

* * * * *